(12) United States Patent
Lucidera

(10) Patent No.: US 10,400,908 B2
(45) Date of Patent: Sep. 3, 2019

(54) SOLENOID VALVE SYSTEM WITH AN INCREASED FLOW RATE

(71) Applicant: METAL WORK S.P.A., Concesio (IT)

(72) Inventor: Marco Lucidera, Concesio (IT)

(73) Assignee: METAL WORK S.P.A., Concesio (BS) (IT)

( * ) Notice: Subject to any disclaimer, the term of this patent is extended or adjusted under 35 U.S.C. 154(b) by 17 days.

(21) Appl. No.: 15/580,913

(22) PCT Filed: Jul. 29, 2016

(86) PCT No.: PCT/IB2016/054566
§ 371 (c)(1),
(2) Date: Dec. 8, 2017

(87) PCT Pub. No.: WO2017/017650
PCT Pub. Date: Feb. 2, 2017

(65) Prior Publication Data
US 2018/0313459 A1 Nov. 1, 2018

(30) Foreign Application Priority Data

Jul. 30, 2015 (IT) .......................... 102015000040276

(51) Int. Cl.
*F16K 11/07* (2006.01)
*F16K 31/06* (2006.01)
*F16K 27/04* (2006.01)

(52) U.S. Cl.
CPC ...... *F16K 31/0613* (2013.01); *F16K 11/0708* (2013.01); *F16K 27/048* (2013.01); *Y10T 137/87885* (2015.04)

(58) Field of Classification Search
CPC ............. F16K 11/0708; F16K 31/0613; F16K 27/048; Y10T 137/87885
(Continued)

(56) References Cited

U.S. PATENT DOCUMENTS 4,889,164 A * 12/1989 Hozumi .............. F15B 13/0814
137/625.64
5,588,465 A 12/1996 Witowski
(Continued)

FOREIGN PATENT DOCUMENTS

CN 101936419 A 1/2011
CN 104421463 A 3/2015
(Continued)

OTHER PUBLICATIONS

International Search Report and Written Opinion for International Application No. PCT/IB2016/054566 (12 Pages) (dated Nov. 17, 2016).
(Continued)

*Primary Examiner* — Craig J Price
(74) *Attorney, Agent, or Firm* — Lucas & Mercanti, LLP

(57) ABSTRACT

The invention describes a system which has a solenoid valve and a base provided with one or more housings adapted for receiving a single solenoid valve. Each solenoid valve and each housing of the base has a respective compressed air inlet ducts, first compressed air delivery ducts, second compressed air delivery ducts, first air discharge ducts and second air discharge ducts. The respective ducts are placed in fluid connection with one another. Each solenoid valve is provided with an air slide valve, configured to selectively place in fluid connection the ducts of the solenoid valve. The air slide valve consists of a single spool movable with reciprocating motion along a predefined direction. Each base is provided with a Y-shaped coupling, configured to connect the first compressed air delivery duct of the base and the second compressed air delivery duct of the base, so as to convey the compressed air towards a single outlet hole.

7 Claims, 7 Drawing Sheets

(58) Field of Classification Search
USPC .................. 137/884, 625–625.5, 269–271
See application file for complete search history.

(56) References Cited

U.S. PATENT DOCUMENTS

| | | | |
|---|---|---|---|
| 5,606,993 A | 3/1997 | Stoll | |
| 6,189,571 B1* | 2/2001 | Hedlund | F15B 13/081 137/269 |
| 6,601,733 B1* | 8/2003 | Schnacky | B05B 7/2497 222/134 |
| 6,640,834 B1 | 11/2003 | Hamkins | |
| 7,591,280 B2* | 9/2009 | Narita | F15B 13/0814 137/269 |
| 8,061,379 B2* | 11/2011 | Inaba | F15B 13/0839 137/271 |
| 9,528,616 B2 | 12/2016 | Nishiyama et al. | |
| 2002/0092571 A1* | 7/2002 | Misumi | F15B 13/0402 137/554 |
| 2003/0131896 A1 | 7/2003 | Yajima et al. | |
| 2009/0255593 A1 | 10/2009 | Nordstrom et al. | |
| 2009/0307405 A1 | 12/2009 | Ottliczky | |
| 2010/0326552 A1 | 12/2010 | Suzuki et al. | |
| 2013/0329377 A1 | 12/2013 | Berner et al. | |
| 2015/0059893 A1 | 3/2015 | Nishiyama et al. | |
| 2019/0003610 A1* | 1/2019 | Lucidera | F16K 11/0716 |

FOREIGN PATENT DOCUMENTS

| | | |
|---|---|---|
| EP | 0628729 A1 | 12/1994 |
| EP | 1026430 A2 | 8/2000 |
| EP | 1729014 A2 | 12/2006 |
| EP | 2530334 A1 | 12/2012 |
| JP | H0293104 A | 4/1990 |
| WO | 2007118487 A1 | 10/2007 |
| WO | 2009100726 A1 | 8/2009 |

OTHER PUBLICATIONS

International Search Report and Written Opinion for International Application No. PCT/IB2016/054575 (12 Pages) (dated Nov. 8, 2016).

International Search Report and Written Opinion for International Application No. PCT/IB2016/054572 (11 Pages) (dated Nov. 18, 2016).

Office Action for Corresponding Chinese Appiication No. 201680037798.4 (6 Pages) (dated Nov. 5, 2018).

* cited by examiner

SOLENOID VALVE SYSTEM WITH AN INCREASED FLOW RATE

CROSS-REFERENCE TO RELATED APPLICATIONS

This application is a 371 of PCT/IB2016/054566, filed Jul. 29, 2016, which claims the benefit of Italian Patent Application No. 102015000040276, filed Jul. 30, 2015.

FIELD OF THE INVENTION

The present invention refers to a system of solenoid valves having increased flow rate.

BACKGROUND OF THE INVENTION

As known, a solenoid valve is an adjustment component of a hydraulic or pneumatic circuit that makes it possible, by means of an electric actuator, to open and close and, more generally, to regulate the passage of a fluid inside the hydraulic circuit. For example, a solenoid valve can be configured to regulate the passage of compressed air between the holes of a pneumatic circuit so as to then be able to optionally command a series of external actuators. The actuator of a solenoid valve normally consists of a slider body that, under the thrusting of an external force of various origin (magnetic, mechanical, piezoelectric, etc.), opens or closes a nozzle.

In certain industrial applications it is required to assemble, on suitable bases, two or more solenoid valves to create a so-called island or battery of solenoid valves. An island or battery of solenoid valves is a set of pneumatic solenoid valves typically consisting of:

a certain number of solenoid valves, each of which comprises an air slide valve inside it, with the relative sealing members, an actuator element generally consisting of a pneumatic piston, configured to move the air slide valve, and an electropilot, consisting of a reel that, with electromagnetic force, moves a core that opens and closes the passage of air to the piston;

one or more bases, which contain the air passage ducts and the electrical power supply for the electropilots. The bases can be fixed to one another in a modular manner, with different systems depending on the manufacturer;

one or more head elements at which the connections for the electrical signals arrive, which are then sorted to the bases, the pneumatic supply ducts and the centralized discharge ducts of the compressed air.

Each solenoid valve is connected in a fixed manner to its base, usually through screws. The design of the solenoid valves and of the bases is carried out so that, at the moment when the solenoid valve is fixed, the air ducts and the electrical connections for the electropilots are connected automatically.

There are solenoid valves with different configurations. These configurations are normally defined by two identifying numbers. The first number indicates the number of air passageways, whereas the second number indicates the number of positions that the air slide valve of the solenoid valve can assume. For example, a "5/2" solenoid valve has five air passageways and two positions of the air slide valve. Hereinafter, purely as an example, some main types of solenoid valves are listed, with the relative operative configurations:

"5/2" solenoid valve with a single electropilot (with pneumatic or spring return);

"5/2" solenoid valve with double electropilot;

two "3/2" solenoid valves housed in the same valve body and in normally open version (in other words, in non-supplied condition of the solenoid valve, the air is able to pass from the inlet ducts to the outlet ducts);

two "3/2" solenoid valves housed in the same valve body and in normally closed version (in other words, in non-supplied condition of the solenoid valve, the air ducts are closed);

two "3/2" solenoid valves housed in the same valve body and with one solenoid valve normally open and the other solenoid valve normally closed;

"5/3" solenoid valve.

FIG. 1 shows a typical solenoid valve according to the prior art, which contains two "3/2" solenoid valves in the same body. Reference numerals 101 and 102 indicate the two air slide valves, otherwise known as spools, whereas reference numerals 201 and 202 indicate the respective control pistons. When the electropilot makes the compressed air reach each control piston 201 and 202, this pushes the respective spool 101 and 102 towards the central hole 300 of the solenoid valve. When the electrical power supply is interrupted, each spool 101 and 102 goes back into rest position pushed by a spring, or pushed by the compressed air that is always present in the central hole 300 of the solenoid valve.

In certain applications there is a need to be able to have both a first group of solenoid valves with a certain flow rate of compressed air, and at least one second group of solenoid valves with a flow rate of compressed air greater than that of the first group of solenoid valves. This requirement can typically be met in two ways:

installing two distinct islands of solenoid valves, wherein a first island comprises small sized valves and the second island comprises large sized valves;

making islands of solenoid valves in which it is possible to house both small sized valves, and large sized valves.

For example, document EP-A-1026430 to the same Applicant illustrates an island of solenoid valves in which it is possible to house both small sized solenoid valves, and large sized solenoid valves. Document EP-A-1729014 illustrates a compressed air dispensing apparatus provided with a device for increasing the flow rate of compressed air without increasing the size of such an apparatus. U.S. Pat. No. 5,606,993 also illustrates a solenoid valve provided with a device for increasing the flow rate of compressed air.

The solution most often adopted to combine solenoid valves of different sizes consists of making modular bases with different width, typically with one base twice as wide as the other, and designing and making solenoid valves with different widths. In a practical embodiment, small bases with four positions and large bases, of equal total width with respect to the small bases, which however contain only two positions, were built. Consequently, such bases are capable of housing two different types of solenoid valves, in which one is double the width of the other.

With respect to the prior art, wherein completely separate small islands and large islands are provided, this embodiment offers substantial advantages in terms of modularity. On the other hand, this embodiment forces different bases and different solenoid valves, small and large, to be designed, manufactured and managed.

The aim of the large solenoid valve is to allow a greater air flow rate. The air flow rate depends on the size of the passage ducts, both inside the base, and inside the solenoid valve. Consequently, making larger solenoid valves and bases makes it possible to increase the size of the ducts.

Vice-versa, the smaller solenoid valves, provided with passage ducts of relatively reduced dimensions, are unable to increase their air flow rate.

SUMMARY OF THE INVENTION

The purpose of the present invention is therefore to make a system of solenoid valves with increased flow rate that is able to solve the aforementioned drawbacks of the prior art in an extremely simple, cost-effective and particularly functional manner.

In detail, a purpose of the present invention is to make a system of solenoid valves with increased flow rate that can operate with variable air flow rates according to the requirements of use, even with small dimensions of the solenoid valves and of the respective air ducts.

Another purpose of the present invention is to make a system of solenoid valves with increased flow rate that can operate with a single type of standard base.

A further purpose of the present invention is to make a system of solenoid valves with increased flow rate that allows the replacement at any time of one or more of the solenoid valves of an island, increasing the air flow rates without having to change the island itself.

These and other purposes according to the present invention are accomplished by making a system of solenoid valves with increased flow rate as outlined in claim 1.

Further characteristics of the invention are highlighted by the dependent claims, which are an integral part of the present description.

In general, the system of solenoid valves with increased flow rate according to the present invention foresees the presence of solenoid valves and of respective bases provided with air ducts that work in parallel. According to this configuration, a "small" solenoid valve, provided with "small" air ducts that work in parallel, is able to increase (approximately double) the air flow rate, approaching the performance of a "large" solenoid valve with standard air ducts.

BRIEF DESCRIPTION OF THE DRAWINGS

The characteristics and advantages of a system of solenoid valves with increased flow rate according to the present invention will become clearer from the following description, given as an example and not for limiting purposes, referring to the attached schematic drawings, in which.

DETAILED DESCRIPTION OF THE INVENTION

Figure 1:
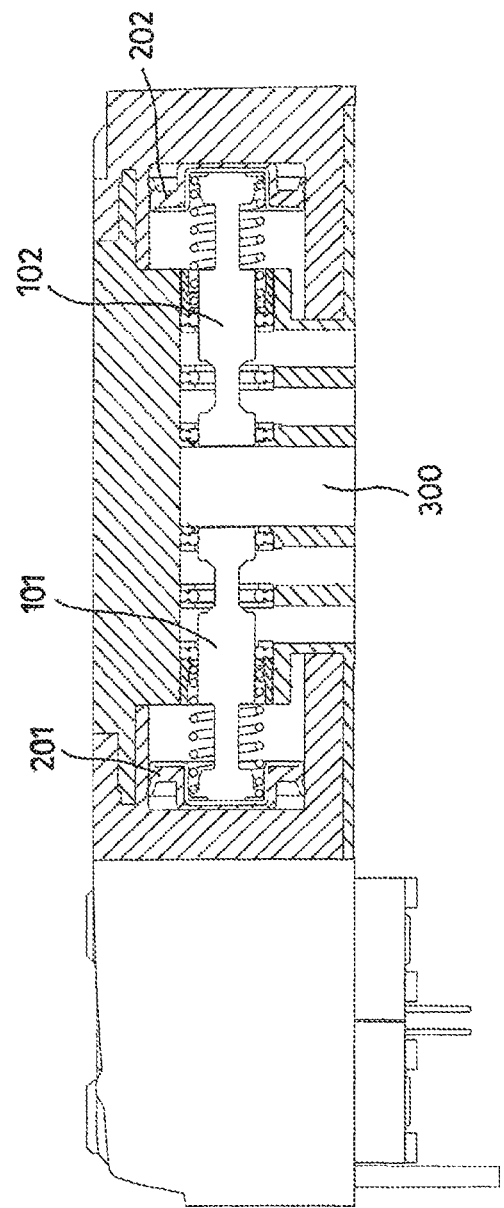
FIG. 1 is a section view of a solenoid valve according to the prior art.

It should be specified that, in the different attached figures, identical reference numerals indicate elements that are the same or equivalent to one another. It should also be specified that, in the following description, numerous components of the system of solenoid valves will not be mentioned, since they are components that are well known to the person skilled in the art.

Figure 2:
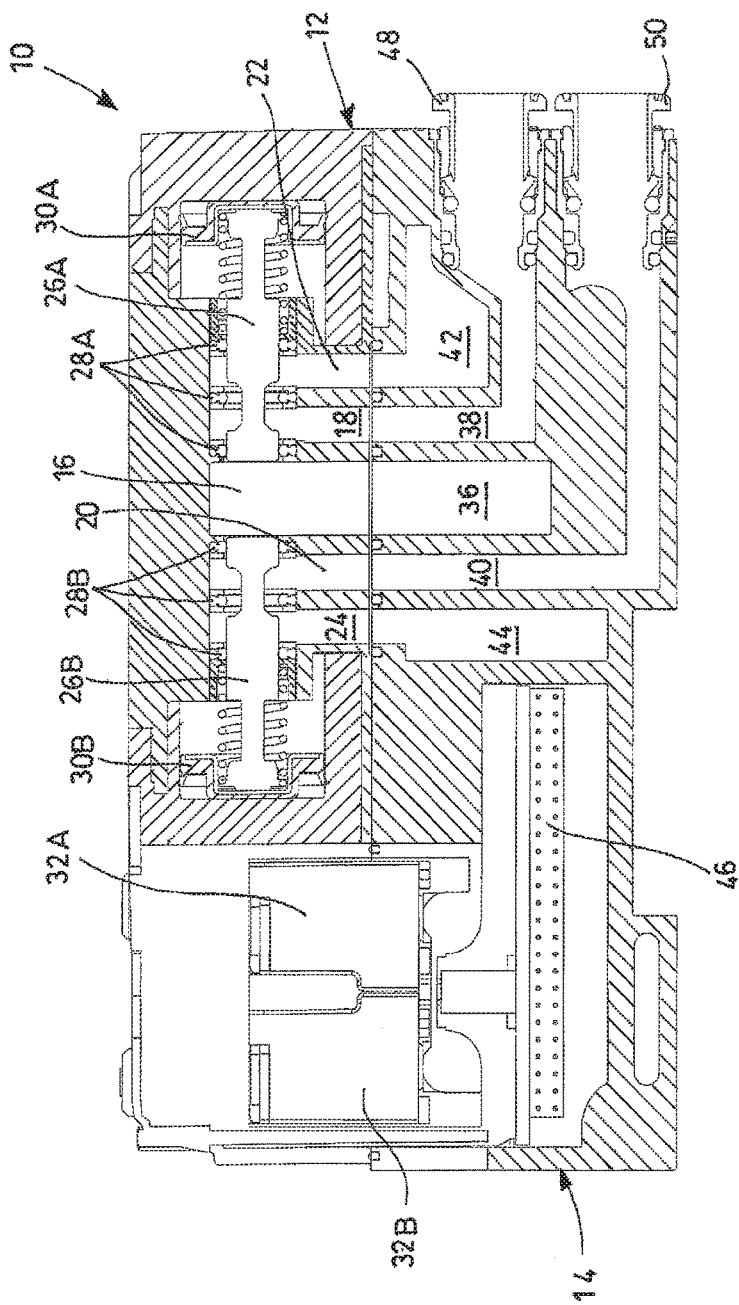
FIG. 2 is a section view of a system of solenoid valves according to the prior art, wherein a solenoid valve of the "3/2" type is shown in closed configuration.
Figure 3:
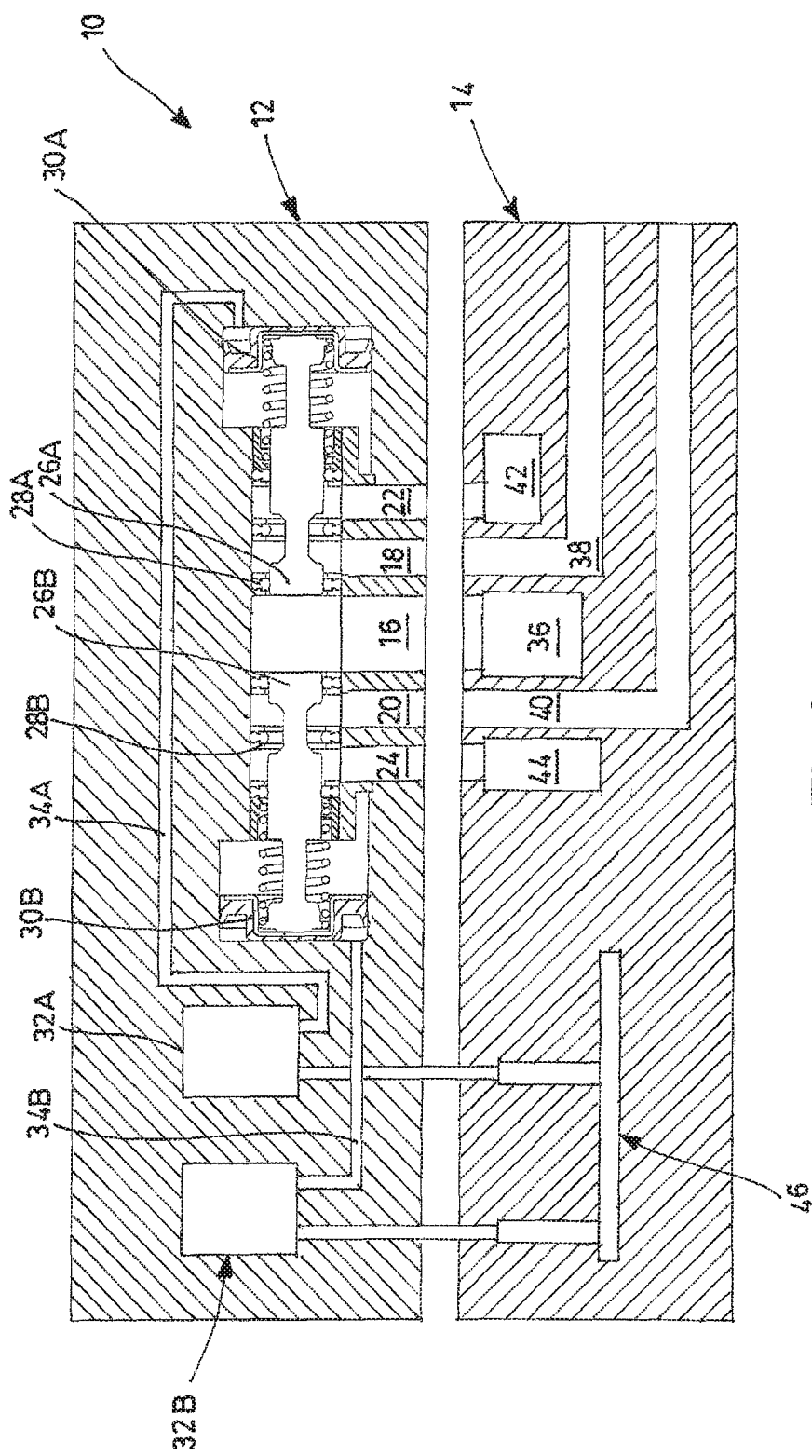
FIG. 3 is a schematized section view of the system of solenoid valves of FIG. 2.

With reference in particular to FIGS. 2 and 3, a system of solenoid valves according to the prior art is shown, wholly indicated with reference numeral 10. The system of solenoid valves 10 comprises at least one solenoid valve 12 and at least one base 14 operatively connected to such an at least one solenoid valve 12. The solenoid valve 12 is of the type that contains two "3/2" solenoid valves, in other words each with three air passageways and with two positions of the air slide valve. Both of the "3/2" solenoid valves are normally closed.

Each solenoid valve 12 is provided with at least one compressed air inlet duct 16, with at least one first compressed air delivery duct 18 for delivering compressed air towards the users and with at least one second compressed air delivery duct 20 for delivering compressed air towards the users. Each solenoid valve 12 is also provided with at least one first air discharge duct 22 and with at least one second air discharge duct 24 or returning the air from the users.

Each solenoid valve 12 is internally provided with an air slide valve 26 placed in fluid connection with the compressed air inlet duct 16, the compressed air delivery ducts 18 and 20 for delivering compressed air towards the users and the air discharge ducts 22 and 24 for returning the air from the users. The air slide valve 26 consists of a pair of opposite spools 26A and 26B movable with reciprocating motion along a same axis.

Each spool 26A and 26B is provided with respective sealing elements 28A and 28B between the spool 26A and 26B and the body of the solenoid valve 12. Each spool 26A and 26B is also provided with a respective actuator element 30A and 30B, for example consisting of a pneumatic piston, configured to axially move the relative spool 26A and 26B.

Each solenoid valve 12 is internally provided with a pair of electropilots 32A and 32B, each of which consists for example of a reel. Each reel, through an electromagnetic force, controls the passage of air in a respective circuit 34A and 34B to drive the respective piston actuator element 30A and 30B.

Each base 14 is provided with one or more housings adapted for receiving a single solenoid valve 12. The solenoid valve 12 is arranged to be fixed, for example through screws, on the respective housing. Each housing is internally provided with air passage ducts 36, 38, 40, 42 and 44 that are placed in fluid connection with the respective air passage ducts 16, 18, 20, 22 and 24 obtained on the solenoid valve 12 fixed onto such a housing. In detail, each housing comprises a compressed air inlet duct 36, a first compressed air delivery duct 38 for delivering compressed air towards the users, a second compressed air delivery duct 40 for delivering compressed air towards the users, a first air discharge duct 42 for returning the air from the users and a second air discharge duct 44 for returning the air from the users.

Each base 14 comprises an electronic board 46 provided with electrical connection means with the electropilots 32A and 32B and configured to supply the electrical power to such electropilots 32A and 32B. Each base 14 is arranged to be fixed in a modular manner to one or more contiguous bases.

Operatively, when one of the electropilots of the solenoid valve 12 is driven, in this case the electropilot 32A, the respective spool 26A moves to place in communication the compressed air, coming from the inlet duct 16 of the solenoid valve 12 and from the corresponding inlet duct 36 of the base 14, with the first delivery duct 18 of the solenoid valve 12 and with the corresponding first delivery duct 38 of the base 14. The compressed air thus reaches a first outlet hole 48 placed downstream of the first delivery duct 38 of the base 14. When the electropilot 32A is de-excited, the respective spool 26A goes back into rest position and the air goes back from the first outlet hole 48 towards the first air discharge duct 22 of the solenoid valve 12 and the first air discharge duct 42 of the base 14.

Similarly, when the other electropilot 32B of the solenoid valve 12 is driven, the respective spool 26B moves to place in communication the compressed air, coming from the inlet duct 16 of the solenoid valve 12 and from the corresponding inlet duct 36 of the base 14, with the second delivery duct 20 of the solenoid valve 12 and with the corresponding second delivery duct 40 of the base 14. The compressed air thus reaches a second outlet hole 50 placed downstream of the second delivery duct 40 of the base 14. When the electropilot 32B is de-excited, the respective spool 26B goes back into rest position and the air goes back from the second outlet hole 50 towards the second air discharge duct 24 of the solenoid valve 12 and the second discharge duct 44 of the base 14.

Figure 4:
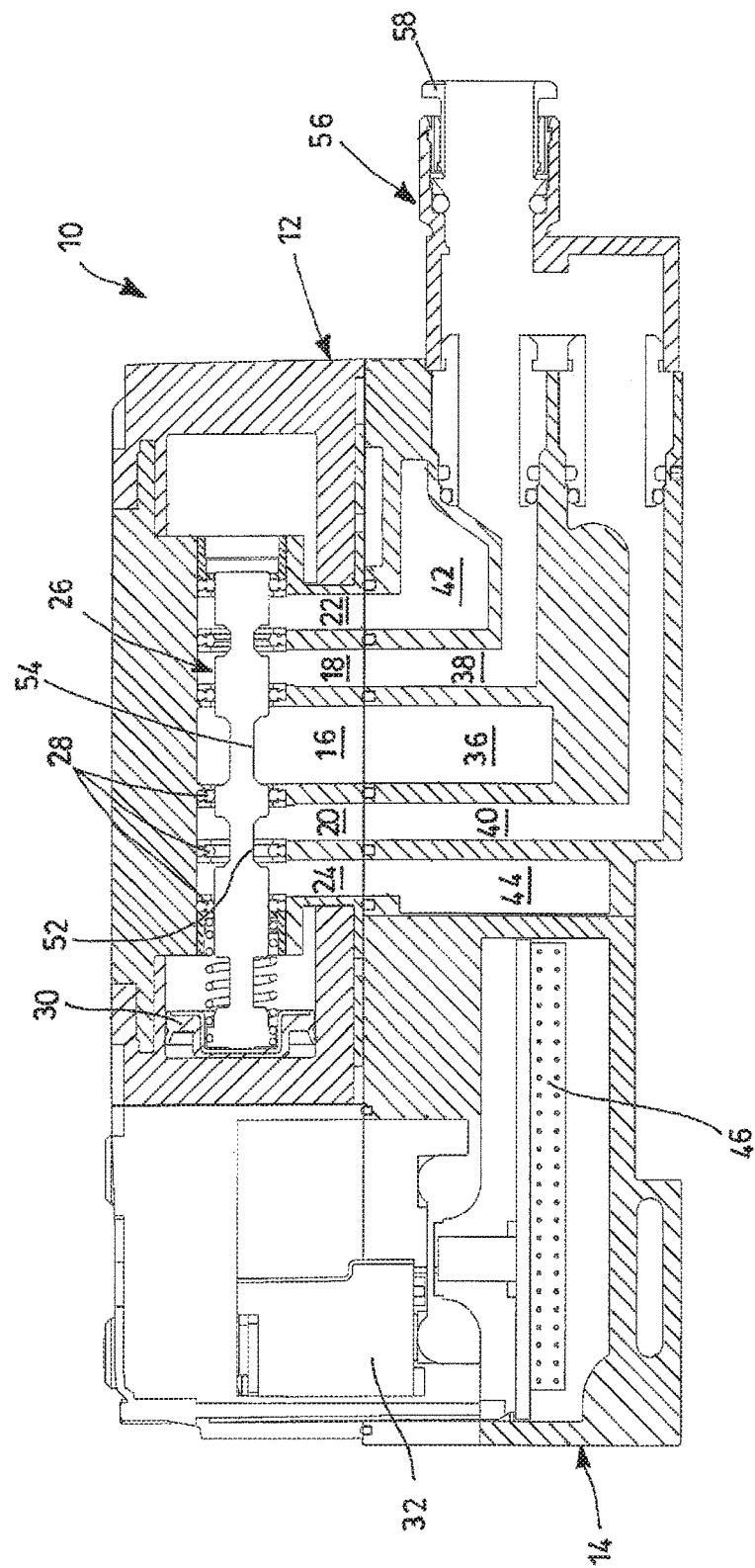
FIG. 4 is a section view of an embodiment of a system of solenoid valves with increased flow rate according to the present invention, wherein a solenoid valve of the "3/2" type is shown in closed configuration.
Figure 5:
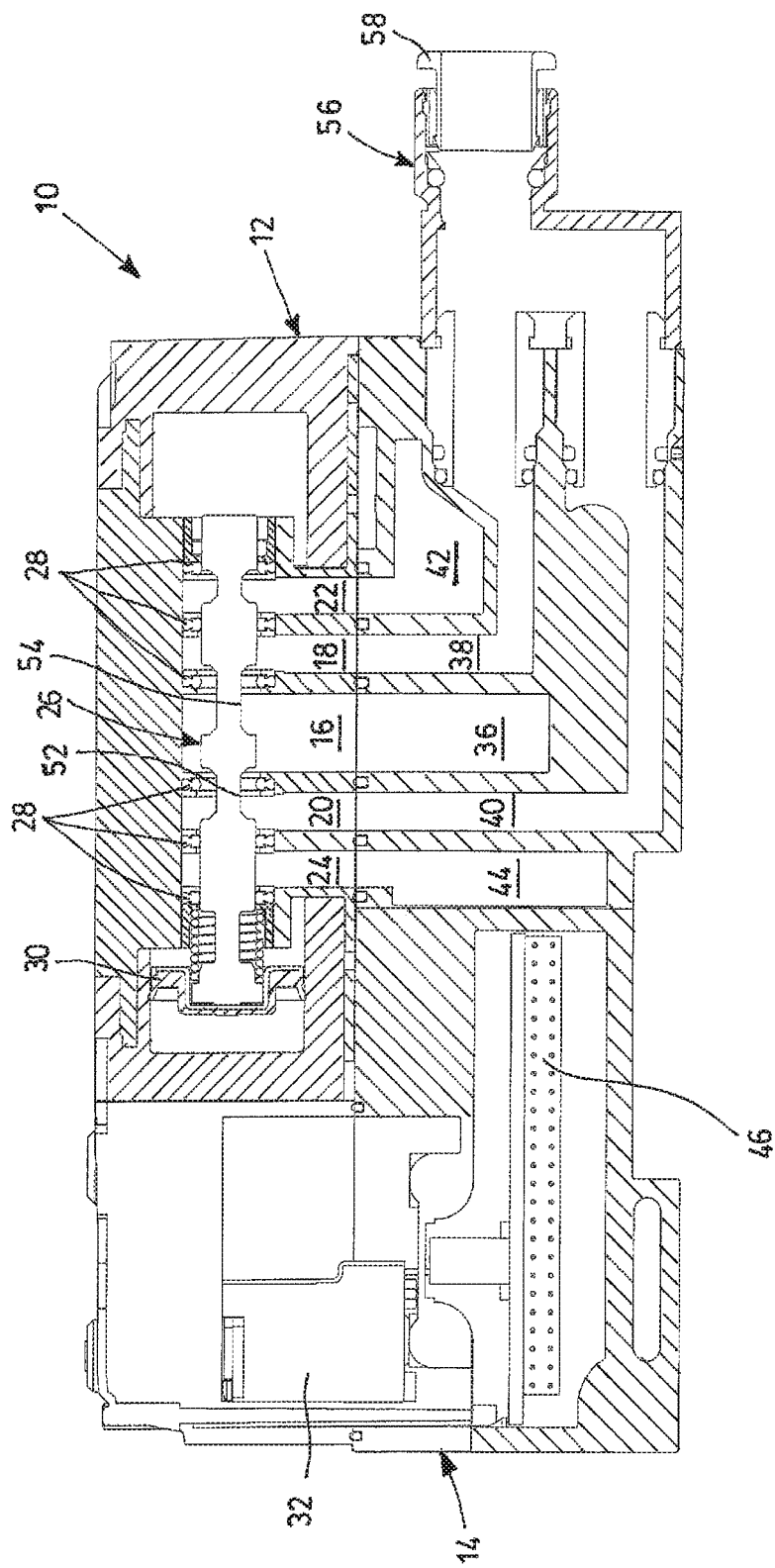
FIG. 5 is a section view of the system of solenoid valves of FIG. 4, wherein the solenoid valve is shown in open configuration.

With reference now to FIGS. 4 and 5, a system of solenoid valves with increased flow rate according to the present invention is shown, again wholly indicated with reference numeral 10. Also in this case the solenoid valve 12 is of the "3/2" type, in other words with three air passageways and with two positions of the air slide valve, and it is normally closed.

The solenoid valve 12 comprises a single electropilot 32 that drives a single piston actuator element 30. The air slide valve 26 consists of a single spool movable with reciprocating motion and provided with sealing elements 28 between the spool 26 and the body of the solenoid valve 12. The spool 26 is provided with fluidic connection means configured to simultaneously place in fluid communication the inlet duct 16 of the solenoid valve 12 and the corresponding inlet duct 36 of the base 14 both with the first delivery duct 18 of the solenoid valve 12 and with the corresponding first delivery duct 38 of the base 14, and with the second delivery duct 20 of the solenoid valve 12 and with the corresponding second delivery duct 40 of the base 14.

In detail, the spool 26 consists of a cylindrical piston having predefined diameter and the fluidic connection means consist of one or more sections of the piston having a diameter smaller than the predefined diameter of such a piston, so as to form cavities 52 and 54 arranged to simultaneously place in fluid communication the inlet duct 16 of the solenoid valve 12 with the first delivery duct 18 of the solenoid valve 12 and with the second delivery duct 20 of the solenoid valve 12.

Each base 14 is provided with a suitable Y-shaped coupling 56, which connects the first delivery duct 38 and the second delivery duct 40 of such a base 14 to convey the compressed air intended for the users towards a single outlet hole 58. Consequently, when the electropilot 32 is driven, the spool 26 moves to place in communication the compressed air, coming from the inlet duct 16 of the solenoid valve 12 and from the corresponding inlet duct 36 of the base 14, simultaneously with both of the delivery ducts 18 and 20 of the solenoid valve 12 and with both of the delivery ducts 38 and 40 of the base 14 (configuration of FIG. 5). When the electropilot 32 is de-excited, the spool 26 goes back into rest position and the air simultaneously goes back from the single outlet hole 58 towards both of the air discharge ducts 22 and 24 of the solenoid valve 12 and both of the discharge ducts 42 and 44 of the base 14 (configuration of FIG. 4).

The system of solenoid valves 10 with increased flow rate according to the present invention thus makes it possible to make a "3/2" normally closed solenoid valve that, by using a "small" base and a "small" valve body, makes it possible to deliver substantially double the air flow rate with respect to a conventional "3/2" solenoid valve of equal size. The system of solenoid valves 10 can in any case comprise one or more normally open "3/2" solenoid valves, which differ from the normally closed solenoid valve 12 described up to now due to the configuration of the spool 26. In detail, the arrangement and the dimensions of the cavities 52 and 54 of the spool 26 can change. The system of solenoid valves 10 can also comprise one or more bistable solenoid valves 12, in other words each provided with two electropilots 32, one of which drives the movement of the spool 26 in one direction and the other drives the movement of such a spool 26 in the opposite direction along the predefined movement direction of such a spool 26.

The reunification of the two delivery ducts 38 and 40 of the base 14 can be carried out through a Y-shaped coupling 56 that is placed externally with respect to such a base 14. Alternatively, the Y-shaped coupling 56 is fixed at the outlet holes 48 and 50 of the base 14. In this way it avoids having to use an external Y-shaped element. A further improvement consists of making the Y-shaped coupling 56 perfectly interchangeable with the single outlet holes 48 and 50 of the base 14. In this way it is possible at any time to replace two single couplings with a special coupling or vice-versa.

In the system of solenoid valves 10 according to the present invention, by combining two "3/2" solenoid valves with increased flow rate it is also possible to obtain other configurations according to the following scheme.

| Normally closed "3/2" valves | Normally open "3/2" valves | Bistable "3/2" valves | configuration with increased flow rate |
|---|---|---|---|
| 1 | 1 | | "5/2" monostable |
| | | 2 | "5/2" bistable |
| | 2 | | "5/3" with open centers |
| 2 | | | "5/3" with discharging centers |

In other words, according to the above scheme, by combining a "3/2" normally closed solenoid valve with a "3/2" normally open solenoid valve, both with increased flow rate, the behavior of a monostable "5/2" solenoid valve is obtained, also with increased flow rate. Similarly, by using two bistable "3/2" solenoid valves with increased flow rate the behavior of a bistable "5/2" solenoid valve with increased flow rate is obtained. By using two "3/2" solenoid valves with increased flow rate, wherein both of the solenoid valves are normally closed or normally open, on the other hand, the behavior of a "5/3" solenoid valve is obtained.

Figure 6A:
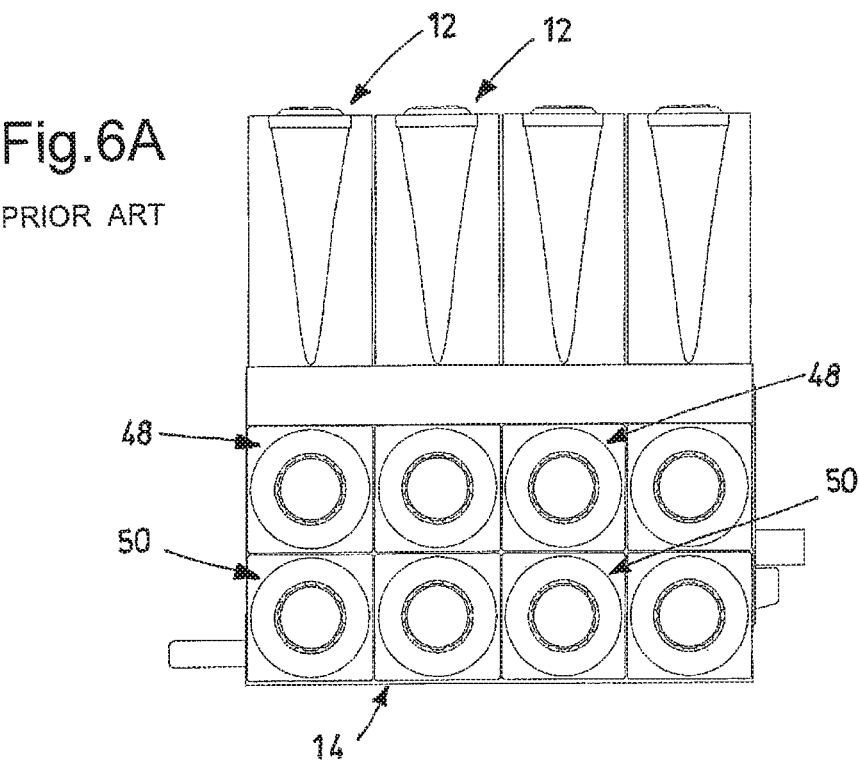
FIG. 6A is a front view of a system of solenoid valves according to the prior art.
Figure 6B:
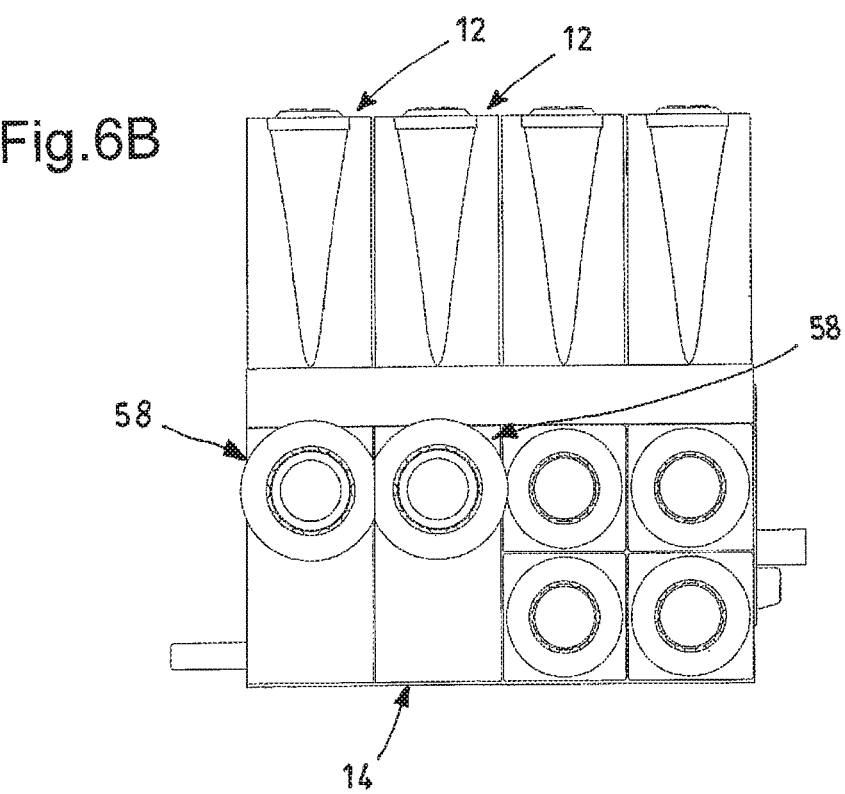
FIG. 6B is a front view of a system of solenoid valves with increased flow rate according to the present invention.

Concerning this, FIG. 6A shows a front view of an island of solenoid valves according to the prior art. At each solenoid valve 12, on the respective base 14, the two outlet holes 48 and 50 are obtained. FIG. 6B, on the other hand, represents a configuration in which the solenoid valves 12 are of the type according to the present invention, in other words with increased flow rate. Indeed, there is only one outlet hole 58 for each solenoid valve 12, as described earlier.

Figure 7A:
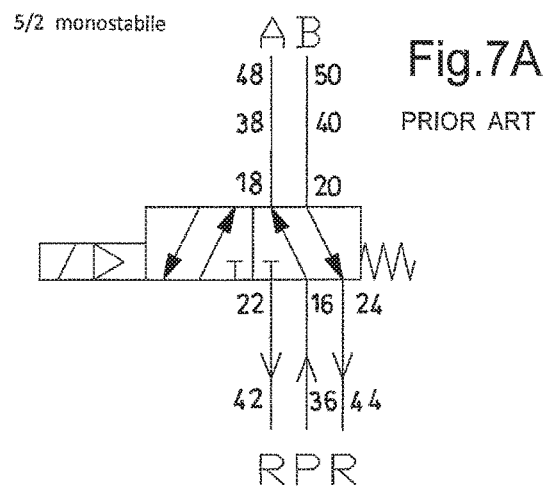
FIGS. 7A-7C show the pneumatic schemes of respective monostable "5/2" solenoid valves, normally open "3/2" solenoid valves with increased flow rate and normally closed "3/2" solenoid valves with increased flow rate.
Figure 7B:
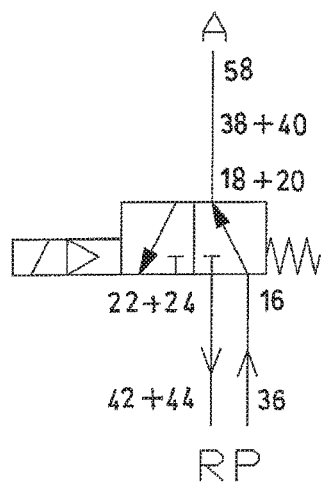
Figure 7C:
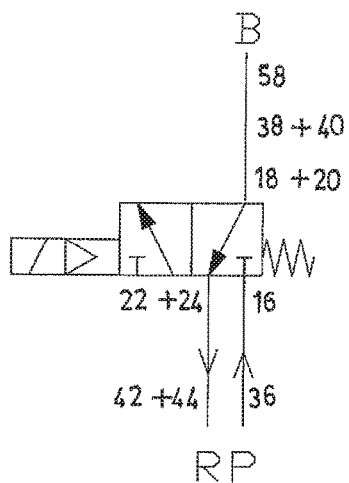

The operation is more easily understood using the pneumatic symbols of FIGS. 7A-7C. In the monostable "5/2" solenoid valve of FIG. 7A the supply P is connected with the outlet hole A when the electropilot is de-excited. The hole B is connected to the discharge. By exciting the electropilot, the spool moves so that the supply P connects to the hole B, whereas the hole A connects to the discharge.

By using two "3/2" solenoid valves with increased flow rate the same operating principle is obtained, considering the single outlet hole of the "3/2" normally open solenoid valve (FIG. 7B) as hole A and the only outlet hole of the "3/2" normally closed solenoid valve (FIG. 7C) as hole B. By simultaneously exciting or de-exciting the electropilots of the two "3/2" solenoid valves with increased flow rate the operation of a single monostable "5/2" solenoid valve according to the prior art is thus obtained.

It has thus been seen that the system of solenoid valves with increased flow rate according to the present invention achieves the purposes highlighted earlier, in particular obtaining the following advantages:

the base of a single type makes it possible to connect both to standard solenoid valves, and to solenoid valves with increased flow rate;

the solenoid valves with increased flow rate can have the same dimensions as the corresponding standard solenoid valves;

the solenoid valves with increased flow rate are constructively identical to the corresponding standard solenoid valves apart from a single specific component, which is the spool;

it is possible, at any time, to replace one or more solenoid valves of one same island, obtaining increased flow rates without having to change the island itself.

The system of solenoid valves with increased flow rate of the present invention thus conceived can in any case undergo numerous modifications and variants, all of which are covered by the same inventive concept; moreover, all of the details can be replaced by technically equivalent elements. In practice, the materials used, as well as the shapes and sizes, can be whatever according to the technical requirements.

The scope of protection of the invention is therefore defined by the attached claims.

The invention claimed is:

1. A system of solenoid valves comprising a solenoid valve and a base operatively connected to said solenoid valve, wherein each solenoid valve comprises:
    a compressed air inlet duct,
    a first compressed air delivery duct,
    a second compressed air delivery duct,
    a first air discharge duct,
    a second air discharge duct,
    an air slide valve, configured to selectively place in fluid connection said ducts of the solenoid valve, and
    an electropilot, configured to actuate the air slide valve,
and wherein the base is provided with one or more housings adapted for receiving a single solenoid valve, each housing being internally provided with:
    a compressed air inlet duct, in fluid connection with said compressed air inlet duct of the solenoid valve,
    a first compressed air delivery duct, in fluid connection with said first compressed air delivery duct of the solenoid valve,
    a second compressed air delivery duct, in fluid connection with said second compressed air delivery duct of the solenoid valve,
    a first air discharge duct, in fluid connection with said first air discharge duct of the solenoid valve, and
    a second air discharge duct, in fluid connection with said second air discharge duct of the solenoid valve, the system of solenoid valves wherein the air slide valve consists of a single spool movable with reciprocating motion along a predefined direction and provided with fluidic connection means configured to simultaneously place in fluid communication said compressed air inlet duct of the solenoid valve both with the first compressed air delivery duct of the solenoid valve, and with the second compressed air delivery duct of the solenoid valve, wherein the base is provided with a Y-shaped coupling, configured to connect the first compressed air delivery duct of the base and the second compressed air delivery duct of the base so as to convey the compressed air towards a single outlet hole.

2. The system of solenoid valves according to claim 1, wherein the spool consists of a cylindrical piston having predefined diameter and the fluidic connection means consist of one or more sections of the piston having a diameter lower than the predefined diameter of said piston, so as to form cavities arranged to simultaneously place in fluid communication the compressed air inlet duct of the solenoid valve with the first compressed air delivery duct of the solenoid valve and with the second compressed air delivery duct of the solenoid valve.

3. The system of solenoid valves according to claim 1, wherein the base is provided with a first outlet hole, placed downstream of the first compressed air delivery duct of said base, and with a second outlet hole, placed downstream of the second compressed air delivery duct of said base.

4. The system of solenoid valves according to claim 1, wherein the Y-shaped coupling is placed externally with respect to the base.

5. The system of solenoid valves according to claim 1, wherein the Y-shaped coupling is fixed at said outlet holes of the base.

6. The system of solenoid valves according to claim 1, wherein the Y-shaped coupling is arranged to be interchangeable with said outlet holes of the base.

7. The system of solenoid valves according to claim 1, further comprising one or more bistable solenoid valves, each provided with two electropilots, a first electropilot driving the movement of the spool in one direction and the other electropilot driving the movement of said spool in the opposite direction along the predefined movement direction of said spool.

* * * * *